(12) United States Patent
Tsutsumi

(10) Patent No.: US 12,285,124 B2
(45) Date of Patent: *Apr. 29, 2025

(54) KNIFE HOLDER, KNIFE HOLDER DEVICE, AND KNIFE

(71) Applicant: Yasuhiro Tsutsumi, Kumamoto (JP)

(72) Inventor: Yasuhiro Tsutsumi, Kumamoto (JP)

( * ) Notice: Subject to any disclaimer, the term of this patent is extended or adjusted under 35 U.S.C. 154(b) by 32 days.

This patent is subject to a terminal disclaimer.

(21) Appl. No.: 18/375,569

(22) Filed: Oct. 2, 2023

(65) Prior Publication Data

US 2024/0023741 A1 Jan. 25, 2024

Related U.S. Application Data

(63) Continuation of application No. PCT/JP2022/000442, filed on Jan. 8, 2022.

(30) Foreign Application Priority Data

Apr. 15, 2021 (JP) ................. 2021-068844

(51) Int. Cl.
  *A47G 21/14* (2006.01)
(52) U.S. Cl.
  CPC .................... *A47G 21/14* (2013.01)
(58) Field of Classification Search
  CPC .................. A47G 21/14; A47J 47/16
  See application file for complete search history.

(56) References Cited

U.S. PATENT DOCUMENTS

| | | | | |
|---|---|---|---|---|
| 2,507,019 A | * | 5/1950 | Johnson | B26B 9/00 30/337 |
| 2,783,536 A | * | 3/1957 | McQueary | B26B 29/025 224/675 |
| 5,245,756 A | * | 9/1993 | Howell | A47G 21/14 30/151 |
| 6,375,016 B1 | * | 4/2002 | Stuchlik, III | A47G 21/14 248/37.3 |
| 2016/0031111 A1 | | 2/2016 | Nasrallah | |

(Continued)

FOREIGN PATENT DOCUMENTS

| CN | 104536369 A | 4/2015 |
|---|---|---|
| CN | 212755394 U | 3/2021 |

(Continued)

OTHER PUBLICATIONS

International Search Report issued in PCT/JP2022/000442 mailed on Mar. 22, 2022 with English Translation (7 pages).

(Continued)

*Primary Examiner* — Kimberly T Wood
(74) *Attorney, Agent, or Firm* — Nakanishi IP Associates, LLC

(57) ABSTRACT

A knife holder includes a holder body configured to hold a top portion of a spine of a knife and suspend the entire knife in air, a magnet attached to the holder body and configured to adhere to and magnetically support the top portion of the spine of the knife in a detachable manner, and a guide provided at an insertion position further in front than the magnet when the knife is inserted from an insertion portion of the holder body, the guide including a contact portion configured to come into contact with the top portion of the spine of the knife at least at a position lower than an adhesion surface of the magnet.

4 Claims, 6 Drawing Sheets

(56) References Cited

U.S. PATENT DOCUMENTS

| | | | | |
|---|---|---|---|---|
| 2022/0183486 A1* | 6/2022 | Tsutsumi | ............... | A47G 21/14 |
| 2024/0206655 A1* | 6/2024 | Tsutsumi | ............... | B26B 29/02 |

FOREIGN PATENT DOCUMENTS

| | | | | | |
|---|---|---|---|---|---|
| DE | 29819964 U1 | * | 7/1999 | ............. | A47G 21/14 |
| DE | 102011050689 A1 | * | 11/2012 | ............. | A47G 21/14 |
| JP | H4-049029 U | | 4/1992 | | |
| JP | H4-040622 Y2 | | 9/1992 | | |
| JP | 2003164382 A | * | 6/2003 | | |
| JP | 2014-033956 A | | 2/2014 | | |
| JP | 2017-012262 A | | 1/2017 | | |
| JP | 2018-138064 A | | 9/2018 | | |
| JP | 6789434 B1 | | 11/2020 | | |
| WO | WO-2007000096 A1 | * | 1/2007 | ............. | A47G 21/14 |

OTHER PUBLICATIONS

Written Opinion of International Searching Authority issued in PCT/JP2022/000442 mailed on Mar. 22, 2022 with English Translation (5 pages).

* cited by examiner

KNIFE HOLDER, KNIFE HOLDER DEVICE, AND KNIFE

CROSS-REFERENCE TO RELATED APPLICATIONS

This application is a continuation application of International Patent Application No. PCT/JP2022/000442 filed on Jan. 8, 2022, which claims priority to Japanese Patent Application No. 2021-068844 filed on Apr. 15, 2021, the entire contents of which are incorporated by reference.

TECHNICAL FIELD

The present invention relates to a knife holder that holds a knife, a knife holder device, and a knife.

BACKGROUND ART

The present applicant has previously experienced difficulties when cooking, such as simultaneously performing cumbersome tasks like cooking on a stovetop, tasting food, adding seasoning, and stirring food that is cooking on the stovetop. Particularly, while ingredients are being heated or during other similar tasks, knives used for cutting ingredients must be returned to the back of the door under the kitchen sink or to a drawer or other compartment, and this may cause food that is being cooked to overflow or cause a user to accidentally injure their hand or finger. To solve this problem, the present applicant devised the knife holder and knife holder device disclosed in Patent Document 1.

CITED DOCUMENTS

Patent Literature

Patent Document 1: JP 6789434 B

SUMMARY OF INVENTION

Problem to be Solved by Invention

The knife holder and knife holder device of Patent Document 1 is a knife holder in which a knife is magnetically and detachably supported by magnets attached to a holder body in which the magnets are arranged in a row at a substantially central position of the holder body, as viewed from one end of the holder body in a width direction. With this configuration, the knife holder can stably accommodate and hold the knife, even if the knife is handled roughly during the cumbersome task of putting away or taking out the knife during cooking. However, in the knife holder and knife holder device of Patent Document 1, strong magnets are used to prevent the knife from falling, which means that a certain degree of strength is required to take out and put away the knife. Thus, storing the knife or taking out the knife from the holder is not entirely stable. Further, when storing the knife in the holder, there is a risk that the knife may fall because the knife is not inserted to a safe position for holding the knife, or because the knife is inserted too deeply and shifts from the positions of the magnets.

The present invention has been made in light of the above-described problem, and an object of the present invention is to provide a knife holder, a knife holder device, and a knife that can stably store and hold a knife at a certain storage position for safe use, even when the knife is frequently stored and taken out during cooking.

Solution to Problem

To solve the above-described problem, the present invention provides a knife holder 1 including a holder body 10 configured to hold a top portion t of a spine bh of a knife h and suspend the entire knife in air; a magnet 30 attached to the holder body 10 and configured to adhere to and magnetically support the top portion t of the spine bh of the knife h in a detachable manner; and a guide 50 provided at an insertion position further in front than the magnet 30 when the knife h is inserted from an insertion portion 7 of the holder body 10, the guide 50 including a contact portion 52 configured to come into contact with the top portion t of the spine bh of the knife h at least at a position lower than an adhesion surface 30as, 30bs of the magnet.

In this case, the guide 50 may be an engaging element 54 or a roller 60 provided in a direction intersecting an insertion direction from a lateral direction of the knife h.

The present invention also provides a knife holder device 120 including the knife holder 1 described in claim 1; and a stand device 150 configured to support the knife holder 1 at a predetermined position from a base 152 in a horizontally long state.

The present invention also provides the knife h magnetically supported by the magnet 30 of the knife holder 1 described in any one of claims 1 to 3, the knife h including a recessed portion 12 formed in the top portion t of the spine bh of the knife h and recessed from a top portion t line of the spine bh of the knife h, the contact portion 52 of the guide 50 fitting into the recessed portion 12.

Effects of Invention

According to the knife holder, knife holder device, and knife of the present invention, the knife can be stably stored and taken out even when the knife is frequently stored and taken out during cooking, thereby improving the quality and content of cooking.

DESCRIPTION OF EMBODIMENTS

Embodiments of a knife holder, a knife holder device, and a knife used in the knife holder and knife holder device will be described with reference to the appended drawings.

Figure 1:
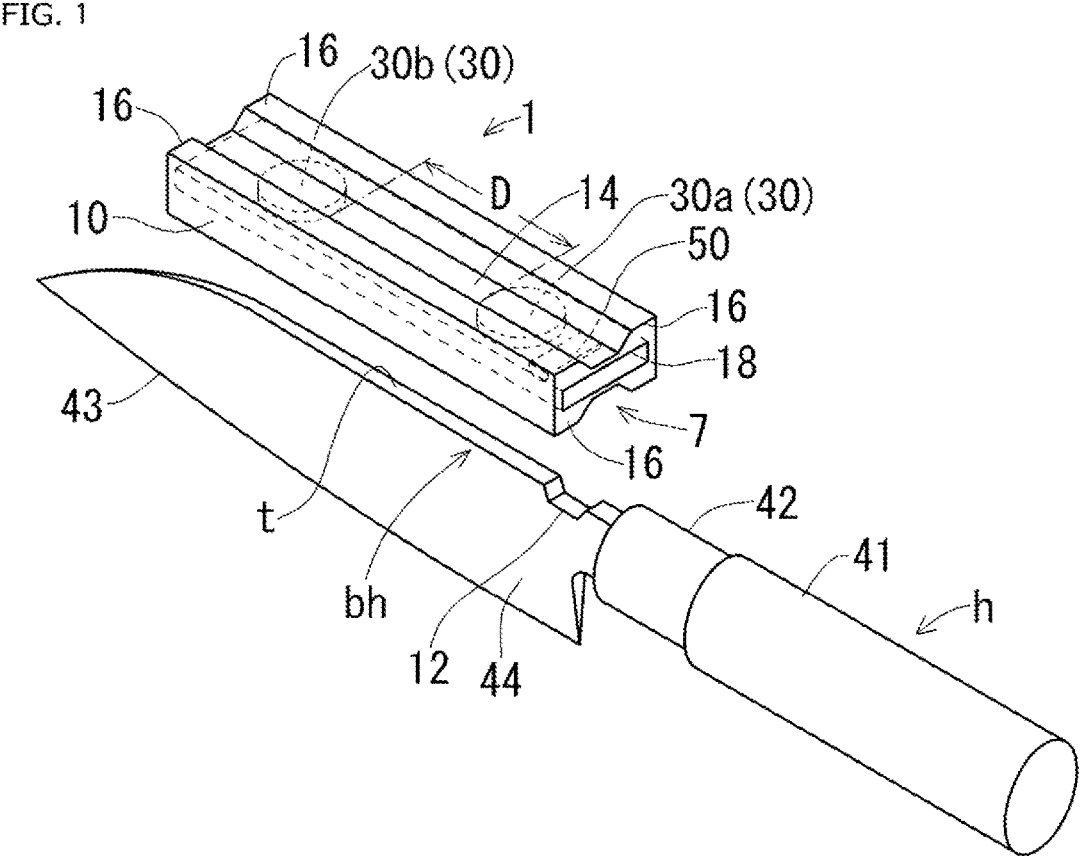
FIG. 1 is a schematic perspective view of a knife holder according to an embodiment of the present invention, where a knife supported by the knife holder is also illustrated.
Figure 2:
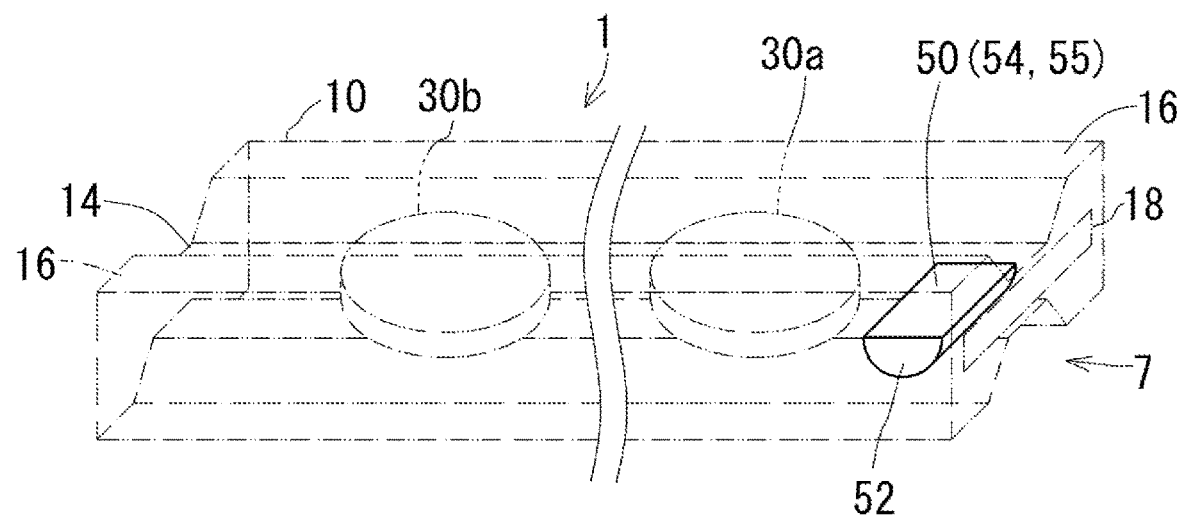
FIG. 2 is an enlarged perspective view of the knife holder in FIG. 1.

FIGS. 1 to 4 illustrate a schematic configuration of a knife holder according to an embodiment of the present invention. In FIGS. 1 and 2, a knife holder 1 includes a holder body 10, magnets 30 attached to the holder body 10, and a guide 50.

The holder body 10 is a body portion of the knife holder that forms the structure of the knife holder and that suspends an entire knife. In the embodiment, the holder body 10 is formed as a plate-like body that is thick in one direction.

As described later, a plurality of magnets are attached to the holder body 10 in a longitudinal direction. The holder body 10 may be any rigid body that can suspend a knife and may be made of any material. For example, the holder body 10 may be made of a hard plastic, a light metal, ceramic, a wood or bamboo material, a metal, an alloy, or a composite material.

As illustrated, the holder body 10 includes a groove-like recessed portion recessed in the longitudinal direction over the entire length of the plate-like body at a central portion of upper and lower plate surfaces when the plate surfaces of the plate-like body are arranged at the top and bottom, respectively. Accordingly, as illustrated in FIG. 2, a portion sandwiched by the top and bottom recessed portions, forming a dumbbell-like shape, in the central portion as viewed from an end face side corresponds to a thin portion 14, and both end sides form enlarged portions 16. Further, an end face side of the holder body 10 serves as an insertion portion 7 used when inserting and mounting a knife. Note that the shape of the holder body 10 is not limited to a shape having a dumbbell-like shaped cross-section and, for example, the top side of the holder body 10 may be expanded and protruded in an arc or ridge shape. Since the top portion of the spine of the knife is to be suspended by magnetic force of the magnets, there must be a space at the underside of the knife with a thickness width greater than the thickness of the knife laid horizontally with the blade facing downwards.

The enlarged portions 16 serve as a base for connecting the holder body 10 to angle fittings and mounting fixtures when the holder body 10 is mounted in a horizontal position on various types of stands or existing kitchen lower sections or fixtures.

Figure 3:
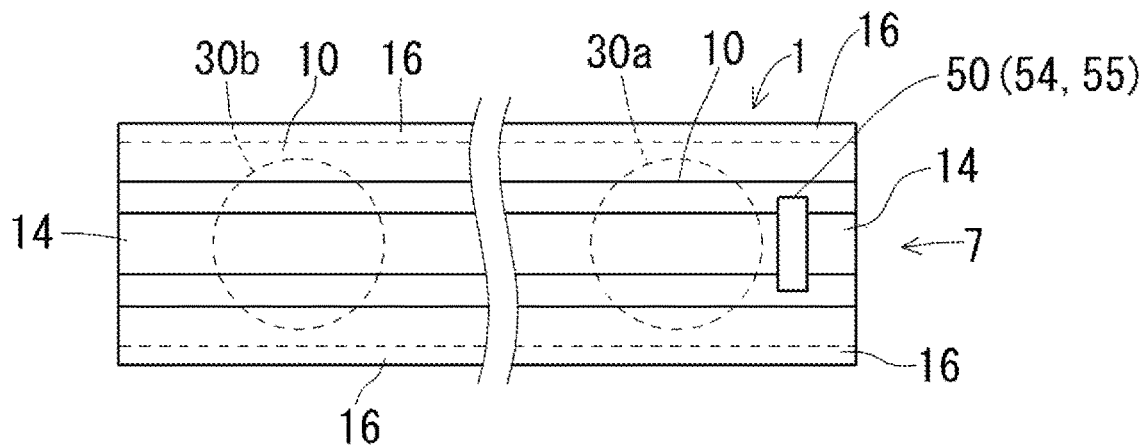
FIG. 3 is a plan view of the knife holder in FIG. 1 with a part omitted.
Figure 4:
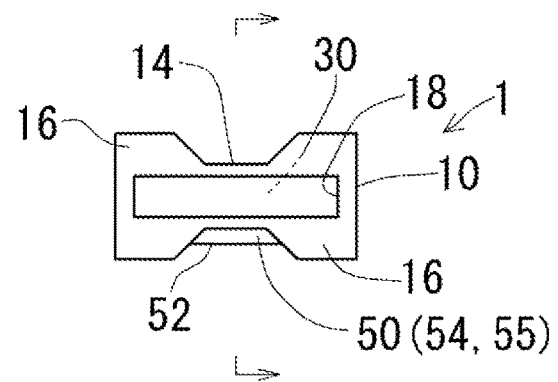
FIG. 4 is a lateral side end view of the knife holder in FIG. 1.

In FIGS. 2 and 3, a long rectangular plate-like hole 18 is bored in the thick portion of the holder body 10 in the longitudinal direction of the holder body, including in the thin portion 14. Further, small permanent magnets 30, for example, are inserted from one end opening of the hole 18 and embedded in the holder body 10 at required spacing intervals. A top portion t of the spine of a knife h magnetically adheres to each magnet 30 at the center of the magnetic field of each magnet 30, such that the knife is suspended horizontally. The permanent magnets 30 in the thin portion ensure that the top portion of the spine of the knife h is magnetically held and that the knife is suspended with the blade facing downward. In the embodiment, as illustrated in FIGS. 2 and 3, a connection portion between the lower thin portion 14 and the enlarged portion 16 has a wall surface that slopes downward in an enlarging direction to form a trapezoidal space. Thus, when the top portion t of the spine of the knife is magnetically held at the center of the top portion t, sufficient gaps are formed on both sides of the top portion t, ensuring that the knife is held in the set position even when handled roughly.

The magnet 30 is a magnetic portion that magnetically supports the top portion t of a spine bh of the knife h in a detachable manner. The magnet 30 is attached to the holder body 10 and suspends a blade b of the knife h facing downward at a lower face of the holder body 10. At least two of the magnets 30 are provided in a row at an interval D to magnetically support the top portion t of the spine bh of the knife h in a detachable manner. In the embodiment, as the magnet 30, two permanent magnets 30a and 30b are attached at the interval D. Note that reference sign 41 denotes a grip of the knife and reference sign 42 denotes a bolster used to attach the knife body to the grip 41.

Further, in the embodiment, the magnets 30 are disposed in a substantially central position of the holder body 10 in the width direction as viewed from one end side. Thus, the top portion t of the spine bh of the knife h magnetically adheres to the holder body 10 with a sufficient gap on either side of a body 44 of the knife when a blade 43 of the knife is suspended facing downward, and the knife can be roughly inserted and removed without the body of the knife coming into contact with the surrounding wall surface, equipment or the like.

The knife holder 1 can be used by being installed in most spaces in a kitchen by using a support stand or a frame that supports the holder body 10. Further, generally speaking, the knife holder 1 may be directly attached to an existing wall or existing equipment using a wall section or equipment in the space where the knife is to be stored.

A characteristic feature of the present invention is that a guide 50 is provided at a front position in a horizontal direction in which the knife h is inserted into the holder body 10. The guide 50 has a contact portion 52 disposed at a front position in the horizontal direction in which the knife h is inserted. The contact portion 52 is a guiding means that comes into contact with the top portion t of the spine bh of the knife h at least at a position lower than the height position of adhesion surfaces 30as and 30bs (FIG. 8, FIG. 9) of the magnets 30 to guide the knife being inserted at a bottom face position of the holder body while comparatively reducing the magnet adhesion force at the insertion entry point of the knife and suppressing the adhesion force. The contact portion 52 is also a component of a positioning means configured to position the knife upon insertion into the knife holder 1 in cooperation with the recessed portion 12 formed in the knife itself, which will be described below.

The magnitude of the adhesion force of the magnets 30 can be changed by changing the mounting height position of the guide 50 to different positions. The height of the contact portion 52 can also be changed vertically by fine degrees of adjustment.

The specific configuration of the guide 50 is not limited and the guide 50 need only have the contact portion 52 that makes contact with the top portion of the spine of the knife at a position lower than the magnet adhesion surfaces 30as and 30bs. In the present embodiment, the guide 50 is configured from an engaging element 54 or a roller including the contact portion 52.

Figure 7:
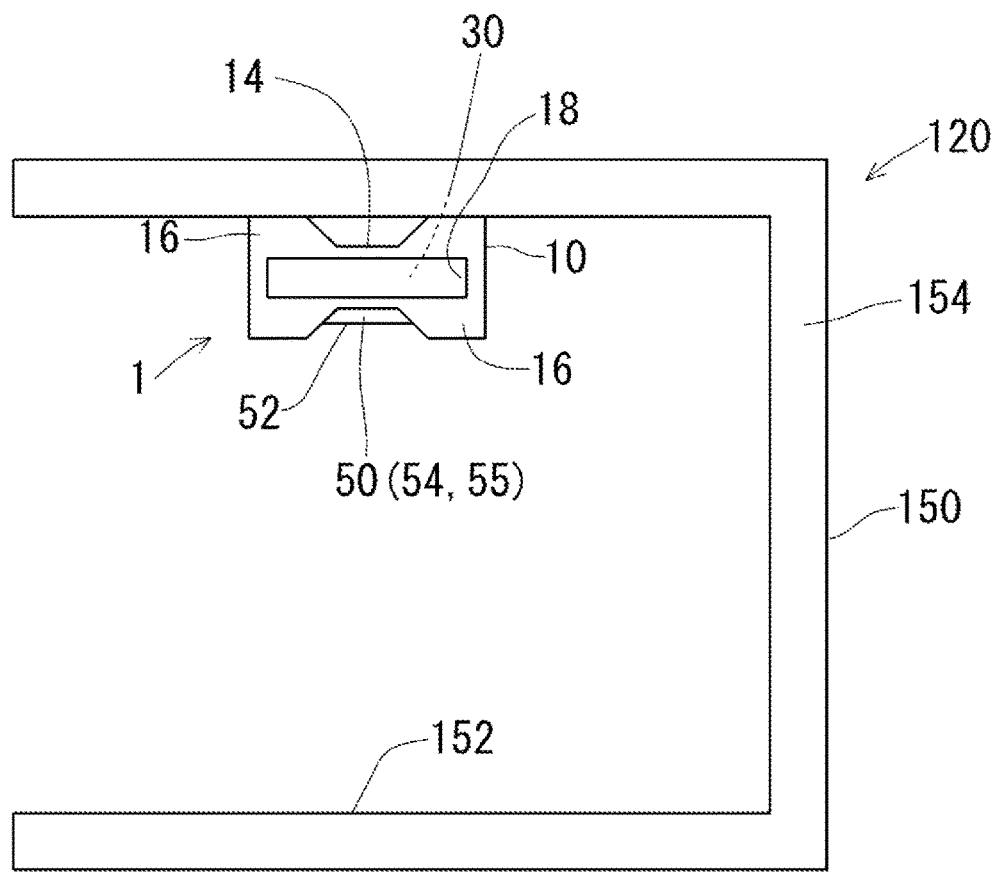
FIG. 7 is a front view of a knife holder device to which the knife holder in FIGS. 1 to 5 is attached.

In the embodiment illustrated in FIGS. 1 to 4, the guide 50 is configured from a pin 55 having a semi-cylindrical shape as an example of the engaging element 54. In the embodiment, the pin 55 having a semi-cylindrical shape is fixed to a lower face side of the holder body 10 using screw fastening or fitting, or another fixing means, with the pin 55 disposed such that the longitudinal direction of the pin 55 faces a direction that intersects or is substantially orthogonal to the longitudinal direction of the holder body with an arc portion facing downwards. Further, the pin 55 is set at an insertion position further in front than the first permanent magnet 30*a* and a position at which an arc top portion line of the semi-cylindrical pin 55 is lower than the adhesion surface of the first permanent magnet 30*a* (FIGS. 6 and 7). With this configuration, the knife can be mounted to the holder and suspended with a light operation and without overly forcefully inserting the knife into the knife holder 1. In the present embodiment, the guide 50 is incorporated into the holder body 10, but the guide 50 may be attached to the holder body 10 by using existing equipment or supports separate from the holder body to move in cooperation with the magnets of the holder body such that the knife can be inserted and mounted smoothly.

Figure 5:
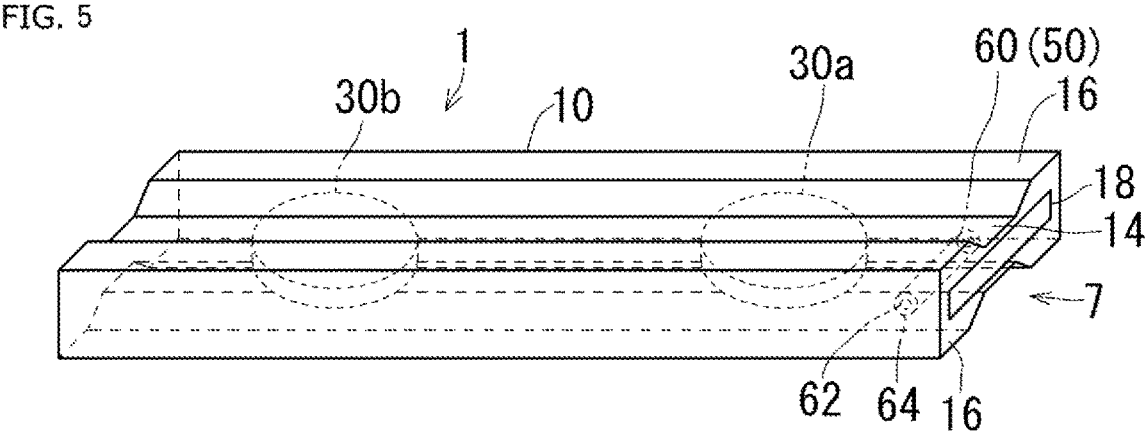
FIG. 5 is a perspective view of another embodiment of the knife holder, in which a roller is used as a guide of the knife holder.
Figure 6A:
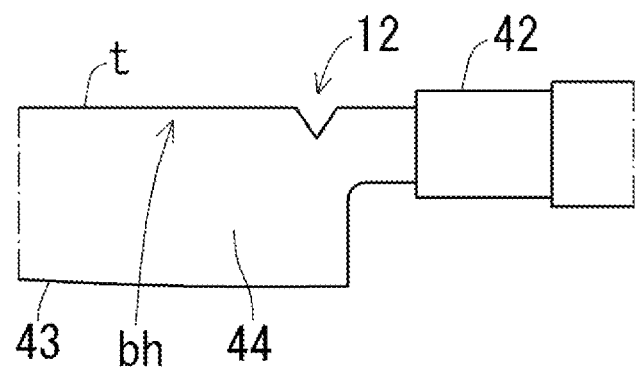
FIGS. 6(a), 6(b), 6(c), and 6(d) are side views illustrating embodiments of different types of recessed portions in the knife mounted to the knife holder according to the embodiment.
Figure 6B:
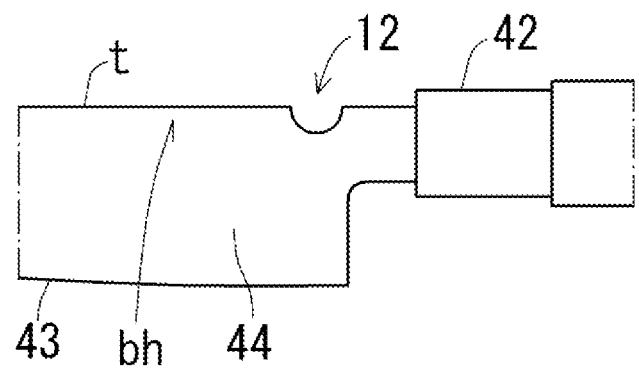
Figure 6C:
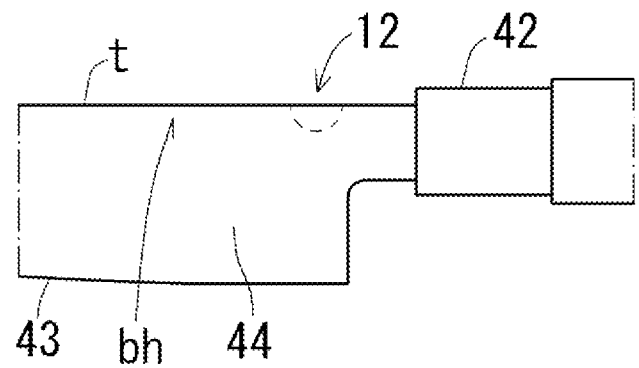
Figure 6D:
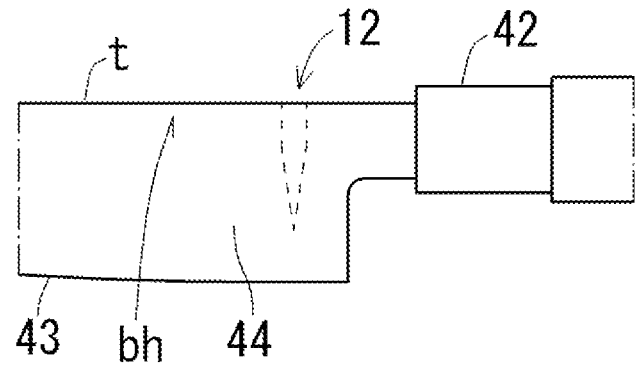

Further, as illustrated in FIG. 5, the guide 50 may also be configured from the roller 60. In the embodiment illustrated in FIG. 5, a roller shaft 62 is attached such that a longitudinal direction of the roller shaft 62 intersects or is substantially orthogonal to the longitudinal direction of the holder body 10, and a roller body 64 is rotatably mounted to the roller shaft. Additionally, the roller 60 is set at an insertion position further in front than the first permanent magnet 30*a* and a position at which a lowest position of the roller surface is lower than the adhesion surface 30*as* of the first permanent magnet 30*a* (FIGS. 6 and 7). With this configuration, the knife can be mounted to the holder and suspended with a light operation and without overly forcefully inserting the knife into the knife holder 1. In the present embodiment, since the roller body 64 rotates, the knife is smoothly displaced in the insertion direction.

Further, the contact portion 52 of the guide 50 may be a projection that simply projects downward. The projection shape of the projection may be any projection shape such as a spherical shape or a hemispherical shape.

The knife holder 1 illustrated in FIGS. 1 to 5 according to the embodiment has a characteristic configuration in which the knife itself is mounted on the holder, which affords the knife holder 1 with an advantageous effect. In FIGS. 1, 2, 8, 9, 10, and 11, the knife h mounted on and supported by the knife holder 1 includes the recessed portion 12 recessed from the top portion line of the spine bh of the knife. The recessed portion 12 is a positioning instruction means that is fitted with the contact portion 52 of the guide 50 installed below the adhesion surface of the magnet, which slides down when the knife moves horizontally to determine the insertion position or stop insertion of the knife into the holder. At that time, the top portion t of the spine of the knife is substantially raised to correspondingly approach the adhesion surface and increase the adhesion force and ensure suspension by adhesion to the magnets.

In the embodiment illustrated in FIGS. 1, 2, 8, 9, 10, and 11, the recessed portion 12 has a long trapezoidal shape with an inverted bottom. The shape of the recessed portion 12 does not need to be limited provided that the contact portion 52 of the guide 50 can slide down into the recessed portion 12 when the knife moves horizontally to fit into the recessed portion 12 to substantially raise the top portion t of the spine of the knife h. For example, the recessed portion 12 may be a rod-like engaging element installed in the lateral direction of the knife holder with a V-shaped cross section that is recessed downward, as illustrated in FIG. 6(*a*), or have an arc-shaped cross section as illustrated in FIG. 6(*b*). The recessed portion 12 may also be a spherical or hemispherical recess as illustrated in FIG. 6(*c*) or a downward-facing rod-like recess as illustrated in FIG. 6(*d*). FIGS. 6(*c*) and 6(*d*) illustrate a tight fitting state when the contact portion 52 of the guide 50 is a downward projecting projection, which maintains the stability of the knife in the fitted state without any rocking back and forth or left and right and has a complete locking function, thus ensuring safety during storage and display. Note that, in the drawings, reference sign 41 denotes a grip of the knife, reference sign 42 denotes a bolster used to attach the knife body to the grip 41, and reference sign 43 denotes the blade of the knife.

Figure 8:
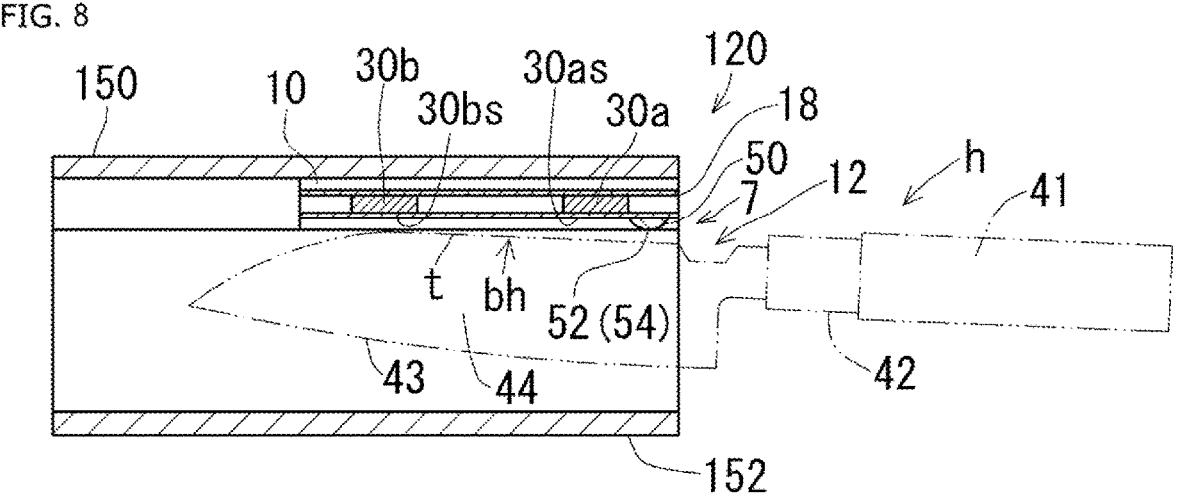
FIG. 8 is a cross-sectional view illustrating a state in which the knife is being mounted to the knife holder device in FIG. 7.
Figure 9:
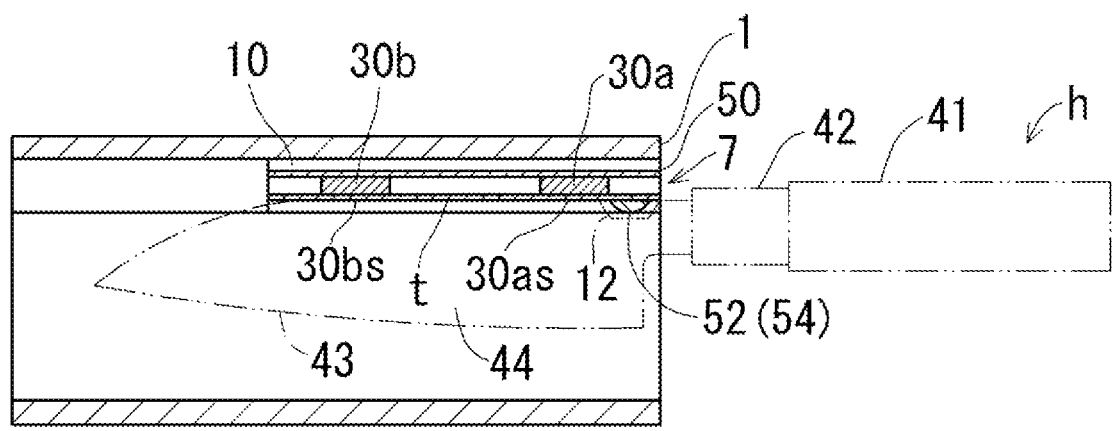
FIG. 9 is a cross-sectional view illustrating a state in which the knife has been mounted to the knife holder device in FIG. 7.

Next, a knife holder device 120 according to a second embodiment of the present invention will be described with reference to FIGS. 7 to 9. The knife holder device 120 includes the knife holder 1 described in the first embodiment, and a stand device 150 that supports the knife holder 1 at a predetermined height.

The stand device 150 is a height supporting means that supports the knife holder 1 at a predetermined height from a base 152 with the knife holder 1 in a horizontally long state. The stand device 150 supports the knife holder 1 at a position at least higher than a straight length (body width) of the knife h from the blade edge to the spine. In the embodiment, the stand device 150 is a device with an overall U-shape and includes the base 152 and an L-shaped plate portion 154 integrally connected to the base 152. The stand device 150 of the present embodiment has an opening on the left or right side in the insertion direction of the knife. This configuration allows the knife to be inserted and removed even when the knife is handled relatively roughly. Additionally, the stand device 150 is easy to manufacture and can be produced at low cost. In particular, forming the stand device 150 of an acrylic plate or other transparent plastic material provides a hygienic product suitable for kitchens and the like. The knife holder 1 can be attached to the stand device 150 using adhesion, screw fixing, or any other fixing method.

Figure 10:
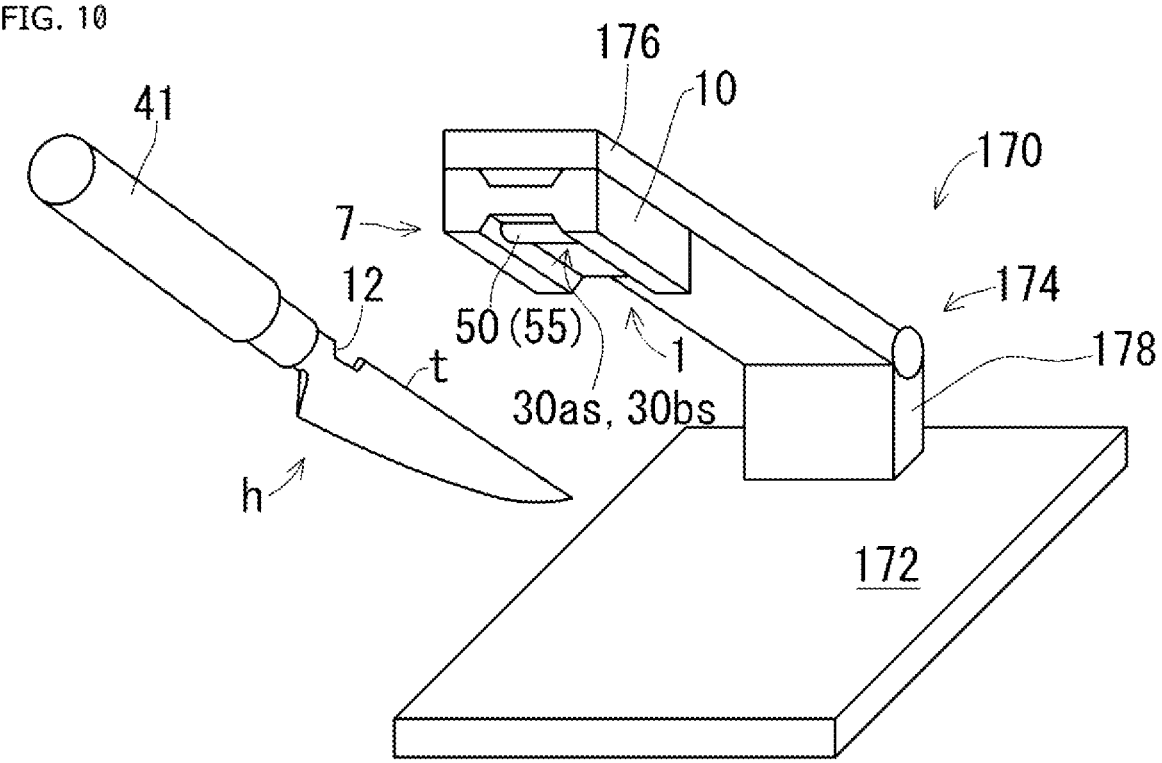
FIG. 10 is a perspective view illustrating another embodiment of the knife holder device.
Figure 11:
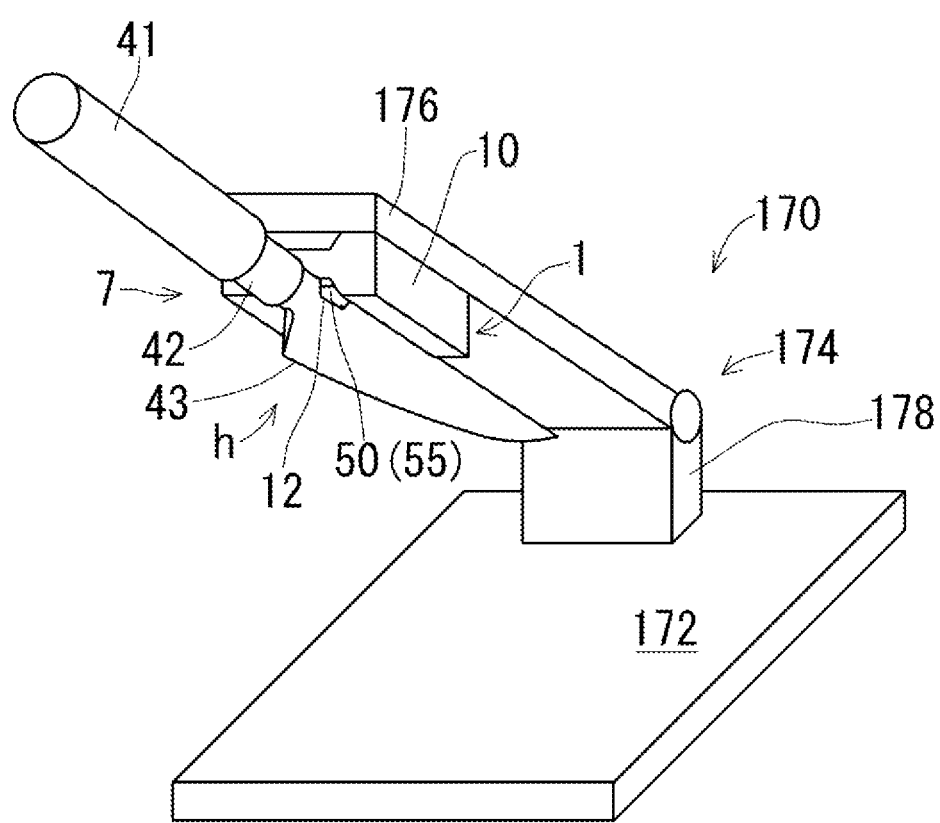
FIG. 11 is a perspective view illustrating a state in which the knife is attached to and supported by the knife holder device in FIG. 10.

As illustrated in FIGS. 10 and 11, a stand device 170 can be configured as a third embodiment. In the drawings, the stand device 170 includes a base plate 172 and a mounting portion 176 that is pivotally attached at one end to the base plate 172 via a pivot support portion 174 and can be opened and closed at the other end for height adjustment. In the embodiment, a base pillar 178 is erected on the base plate 172, and the other end of the mounting portion 176 can be opened and closed and rotated freely via the pivot support portion 174, which includes a pivot pin (not illustrated) and is provided at an upper end of the base pillar 178. The mounting portion 176 can also engage at any rotation position. The mounting portion 176 is made of a long rectangular plate and the knife holder 1 is fixed to a lower face of an end portion of the mounting portion 176. In the third embodiment, the engaging element of the guide 50 is a semi-cylindrical body protruding downward and engages with the knife h, which includes the recessed portion 12 having a long trapezoidal shape with an inverted bottom. Also in the present embodiment, the stand device 170 itself can be easily moved and used. Further, since the knife insertion end of the mounting portion 176, which holds the knife holder 1, can be opened and closed, the knife insertion direction can be set as desired. The stand device 170 itself is not limited to the above configuration and may have any configuration provided that the stand device 170 has a structure that supports the knife holder 1 in a long horizontal state at a required height from the base.

The knife holder of the embodiments described above includes the holder body configured to hold a top portion of a spine of a knife and suspend the entire knife in air; the magnet attached to the holder body and configured to adhere to and magnetically support the top portion of the spine of the knife in a detachable manner; and the guide provided at an insertion position further in front than the magnet when the knife is inserted from an insertion portion of the holder body, the guide including a contact portion configured to come into contact with the top portion of the spine of the knife at least at a position lower than an adhesion surface of the magnet. With this configuration, the knife can be inserted into the holder with a light and easy insertion operation, and insertion and attachment can be performed stably. Further, since the knife is inserted and positioned close to the magnet adhesion surfaces in cooperation with the guide on the knife side, the knife is stably stored and held at a certain position in the holder, even when frequently storing and removing the knife during cooking.

In addition, since the guide is an engaging element or a roller provided in the direction intersecting the insertion direction of the knife from a lateral direction of the knife, the knife can be inserted into the holder with a light and easy insertion operation and insertion and mounting can be performed stably. Further, the knife can be inserted and positioned at specific positions, with specific variations in magnetic adhesion from light adhesion to strong adhesion. Additionally, by using a roller for the guide, the knife can be inserted more smoothly.

By using the knife holder device that includes the knife holder and the stand device that supports the knife holder at a predetermined height from the base in a long horizontal state, the knife holder can be moved freely relative to the stand device and placed and used at any location in a kitchen or cooking area.

Furthermore, the knife is magnetically supported by the magnet of the knife holder and includes the recessed portion that is formed in the top portion of the spine of the knife, is recessed from a top portion line of the spine of the knife, the contact portion of the guide fitting into the recessed portion in a freely detachable manner. Thus, the knife can be inserted and positioned in cooperation with the above-describe guide of the knife holder during insertion, with specific variations in magnetic adhesion from light adhesion to strong adhesion.

The kitchen knife holder, knife holder device, and knife according to the present invention are not limited to the configurations of the above embodiments, and other embodiments may be used to the extent that they do not depart from the essence of the invention as set forth in the claims.

INDUSTRIAL APPLICABILITY

The knife holder, knife holder device, and knife according to the present invention can be installed in a kitchen or around a benchtop that is used daily and can be effectively used when cooking food.

REFERENCE SIGNS LIST

1 Knife holder
10 Holder body
12 Recessed portion
30 Magnet
30as, 30bs Adhesion surface
50 Guide
52 Contact portion
54 Engaging element
60 Roller
120 Knife holder device
150 Stand device
170 Stand device
bh Spine
h Knife
t Top portion

The invention claimed is:

1. A knife holder comprising:
a holder body configured to hold a top portion of a spine of a knife and suspend the entire knife in the air;
a magnet attached to the holder body and configured to adhere to and magnetically support the top portion of the spine of the knife in a detachable manner; and
a guide comprising a roller,
wherein:
the roller is provided at an insertion position further in front than the magnet when the knife is inserted from an insertion portion of the holder body;
the roller is configured to come into contact with the top portion of the spine of the knife at least at a position lower than an adhesion surface of the magnet; and
the roller is provided in a direction intersecting an insertion direction from a lateral direction of the knife.

2. A knife holder device comprising:
the knife holder described in claim 1; and
a stand device configured to support the knife holder at a predetermined position from a base in a horizontally long state.

3. A knife magnetically supported by a magnet of the knife holder described in claim 1,
the knife including a recessed portion formed in a top portion of a spine of the knife and recessed from a top portion line of the spine of the knife,
the contact portion of the guide fitting into the recessed portion in a freely detachable manner.

4. A knife magnetically supported by a magnet of the knife holder described in claim 2,
the knife including a recessed portion formed in a top portion of a spine of the knife and recessed from a top portion line of the spine of the knife,
the contact portion of the guide fitting into the recessed portion in a freely detachable manner.

* * * * *